(12) United States Patent
Heinken

(10) Patent No.: US 11,371,422 B2
(45) Date of Patent: Jun. 28, 2022

(54) METHOD FOR OPEN-LOOP AND/OR CLOSED-LOOP CONTROL OF AN EXHAUST-GAS TURBOCHARGER OF AN INTERNAL COMBUSTION ENGINE MOTOR VEHICLE

(71) Applicant: VOLKSWAGEN AKTIENGESELLSCHAFT, Wolfsburg (DE)

(72) Inventor: Sebastian Heinken, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 222 days.

(21) Appl. No.: 16/864,814

(22) Filed: May 1, 2020

(65) Prior Publication Data

US 2020/0271048 A1 Aug. 27, 2020

Related U.S. Application Data

(63) Continuation of application No. PCT/EP2018/076974, filed on Oct. 4, 2018.

(30) Foreign Application Priority Data

Nov. 2, 2017 (DE) ...................... 10 2017 125 631.8

(51) Int. Cl.
*F02B 37/18* (2006.01)
*F01N 3/021* (2006.01)
(Continued)

(52) U.S. Cl.
CPC ............ *F02B 37/186* (2013.01); *F01N 3/021* (2013.01); *F02B 37/24* (2013.01);
(Continued)

(58) Field of Classification Search
CPC .......... F02B 2037/122; F02B 2037/125; F02B 37/18; F02B 37/183; F02B 37/186;
(Continued)

(56) References Cited

U.S. PATENT DOCUMENTS 6,427,445 B1 * 8/2002 Isaac ................... F02D 41/0007
60/602
9,103,272 B2 8/2015 Buckland et al.
(Continued)

FOREIGN PATENT DOCUMENTS

DE  10 2012 206 352 A1  10/2013
DE  10 2012 206 375 A1  10/2013
(Continued)

*Primary Examiner* — Loren C Edwards
(74) *Attorney, Agent, or Firm* — Muncy, Geissler, Olds & Lowe, P.C.

(57) ABSTRACT

A method for controlling and/or regulating an exhaust gas turbocharger of an internal combustion engine, the exhaust gas turbocharger being protected against an exceeding of a maximum rotational speed, an actual boost pressure being compared with a setpoint boost pressure. The risk of a maximum rotational speed of the exhaust gas turbocharger being exceeded is prevented in that a manipulated variable assigned to the exhaust gas turbocharger is compared with a manipulated variable limit characteristic and is limited, if necessary, the manipulated variable limit characteristic having a time-limited, first portion and a chronologically subsequent, second portion following a change in the setpoint boost pressure, the first portion ending after a predetermined target time, the second portion of the manipulated variable limit characteristic being reduced with respect to the first portion in such a way that the maximum rotational speed of the exhaust gas turbocharger is not reached.

9 Claims, 1 Drawing Sheet

(51) Int. Cl.
*F02B 37/24* (2006.01)
*F02D 41/14* (2006.01)
*F02D 41/00* (2006.01)
*F02B 39/16* (2006.01)
*F02D 23/00* (2006.01)
*F02B 37/12* (2006.01)

(52) U.S. Cl.
CPC ..... *F02D 41/0007* (2013.01); *F02D 41/1401* (2013.01); *F02B 2037/125* (2013.01); *F02B 2039/168* (2013.01); *F02D 23/00* (2013.01); *F02D 2041/1422* (2013.01); *F02D 2250/34* (2013.01)

(58) Field of Classification Search
CPC .... F02B 37/24; F02B 2039/168; F01N 3/021; F02D 2250/34; F02D 23/00; F02D 41/0007; F02D 2041/1422
See application file for complete search history.

(56) References Cited

U.S. PATENT DOCUMENTS

| | | | |
|---|---|---|---|
| 9,708,984 | B2 | 7/2017 | Mueller et al. |
| 2010/0058757 | A1* | 3/2010 | Mueller .................. F02D 23/02 60/602 |
| 2013/0192202 | A1* | 8/2013 | Lambert ............. F02D 19/0655 60/274 |
| 2013/0327039 | A1* | 12/2013 | Schenker ............. F02B 37/186 60/602 |

FOREIGN PATENT DOCUMENTS

| | | |
|---|---|---|
| EP | 1 178 192 A2 | 2/2002 |
| EP | 1 375 876 A2 | 1/2004 |
| FR | 2 843 781 A1 | 2/2004 |
| FR | 2 902 467 A1 | 12/2007 |
| WO | WO 2008/083771 A1 | 7/2008 |

* cited by examiner

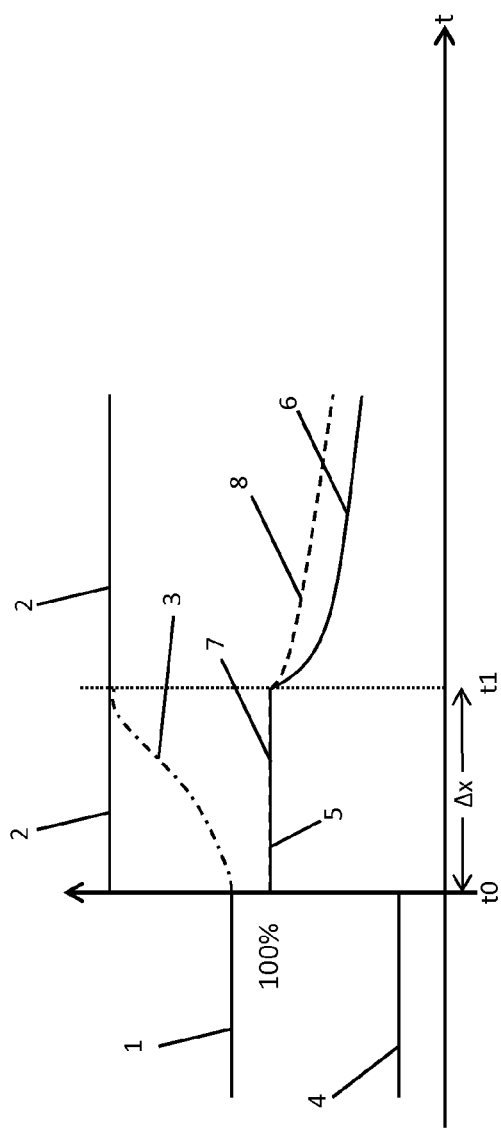
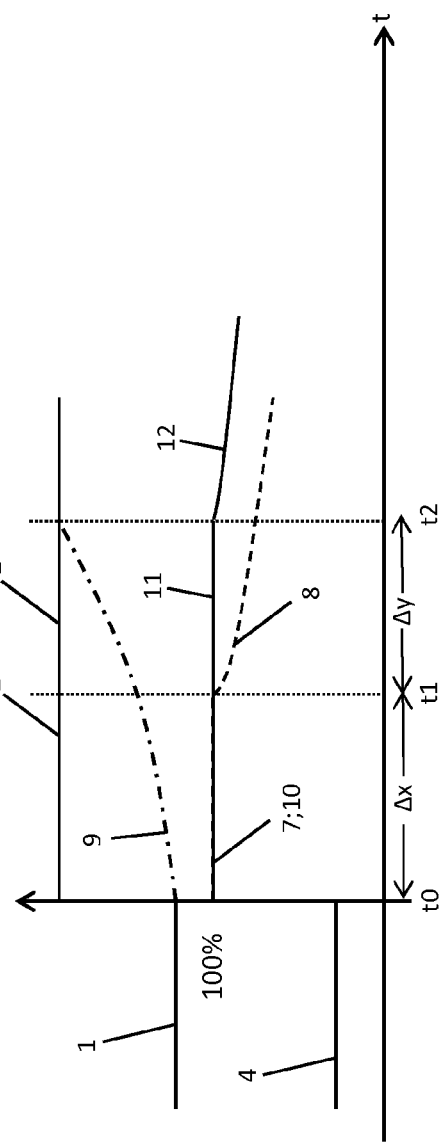

METHOD FOR OPEN-LOOP AND/OR CLOSED-LOOP CONTROL OF AN EXHAUST-GAS TURBOCHARGER OF AN INTERNAL COMBUSTION ENGINE MOTOR VEHICLE

This nonprovisional application is a continuation of International Application No. PCT/EP2018/076974, which was filed on Oct. 4, 2018, and which claims priority to German Patent Application No. 10 2017 125 631.8, which was filed in Germany on Nov. 2, 2017, and which are both herein incorporated by reference.

BACKGROUND OF THE INVENTION

Field of the Invention

The present invention relates to a method for controlling and/or regulating an exhaust gas turbocharger. Within the scope of the invention, the exhaust gas turbocharger is protected against an excess rotational speed.

Description of the Background Art

An exhaust gas turbocharger includes a compressor and a turbine. During an induction stroke, a preferably large amount of fresh gas is transported into the cylinder(s) by the compressor. The turbine is driven for this purpose by the exhaust gas flow and thus also the compressor coupled with the turbine. The heated air precompressed by the exhaust gas turbocharger may be cooled by a boost air cooling system before it enters the cylinders. To protect the exhaust gas turbocharger against damage, the rotational speed of the turbine wheel and the compressor wheel must be prevented from exceeding a maximum rotational speed.

In particular, a manipulated value is used to regulate or control the exhaust gas turbocharger. Exhaust gas turbochargers are provided with a boost pressure regulation, which makes it possible for the exhaust gas turbocharger to have a high power even at low exhaust gas flows and to nevertheless avoid exceeding the load limit at high rotational speeds. An increasing exhaust gas mass flow results in an increasing rotational speed. This boost pressure regulation may take place in different ways. If an exhaust gas turbocharger having a variable turbine geometry (VTG) is used, it includes adjustable guide vanes. Alternatively, an exhaust gas turbocharger having a waste gate may be used. The regulation may take place either via the waste gate, in particular in gasoline engines, or via the adjustable guide vanes, in particular in a diesel engine. This positioning of the waste gate or the guide vanes takes place as a function of the manipulated variable. An electrical actuator is used, in particular, which permits a continuous positioning of the waste gate or the guide vanes. In the case of a boost pressure regulation with the aid of a waste gate, a corresponding bypass valve is used in the exhaust tract. This waste gate or bypass valve may conduct a portion of the exhaust gas flow past the turbine to thereby avoid an increase of the boost pressure. An exhaust gas turbocharger may be used hereby, which already produces sufficient boost pressure at low rotational speeds. At higher charger rotational speeds, a portion of the exhaust gas mass flow is conducted past the turbine to avoid overloading the charger. The guide vanes are adjustable upstream from the turbine wheel in the exhaust gas flow, whereby the power output and the response behavior may be adapted to different operating conditions. In the case of little gas throughput and simultaneously a high power demand, the exhaust gas is accelerated, due to reduced flow cross-sections, and conducted to the turbine blades, which increases the rotational speed of the turbine and thus the power of the compressor. Conversely, the flow velocity may be reduced by large cross-sections in the case of a high gas throughput, which reduces the power of the exhaust gas turbocharger.

The boost pressure provided by the exhaust gas turbocharger now depends on a large number of factors, which should be taken into account in controlling and/or regulating the exhaust gas turbocharger. When regulating the exhaust gas turbocharger, the goal is for an actual boost pressure to reach a setpoint boost pressure. For example, if a leak occurs in the pressure pipe between the compressor and the particular cylinder, the setpoint boost pressure is reached only later, since the actual boost pressure is reduced by the leak. In the case of larger leaks, the setpoint boost pressure may not even be reached at all. Moreover, the function of the exhaust gas turbocharger depends on an exhaust gas back pressure in the exhaust tract. If the exhaust gas back pressure increases, less energy is available for driving the turbine. In other words, the actual boost pressure builds up more slowly in such a case than in the case of a lower exhaust gas back pressure. In an internal combustion engine which has a particulate filter, for example a gasoline engine particulate filter, the exhaust gas back pressure is not constant. For example, a temporary back pressure increase may take place in the exhaust gas system due to an accumulation of soot, ash and/or water.

A method for controlling an internal combustion engine, which comprises a motor, an exhaust gas turbocharger group and a transmission, is known from DE 10 2012 206 352 A1. The exhaust gas turbocharger group includes a base exhaust gas turbocharger and a switching exhaust gas turbocharger. The base exhaust gas turbocharger and the switching exhaust gas turbocharger may be designed as exhaust gas turbochargers having a variable turbine geometry. The operation of the engine is controlled using a dynamic rev limiting regulation (RLR). A primary RLR characteristic having a primary breakaway curve and an RLR characteristic having a secondary breakaway curve are provided for the controlled operation of the engine. The values in the secondary breakaway curve are lower than the values in the primary breakaway curve. The engine is operated either according to the primary RLR characteristic or, in the case of a signaled, predetermined operating mode of the transmission, according to the secondary RLR characteristic. A limiting value of the first primary characteristic, in particular a limit-value rotational speed of the exhaust gas turbocharger and/or a limit-value rotational speed of the engine, is detected during the operation of the engine.

SUMMARY OF THE INVENTION

It is therefore an object of the present invention to design and refine the generic method in such a way that the risk of exceeding a maximum rotational speed of the exhaust gas turbocharger is reduced.

A manipulated variable assigned to the exhaust gas turbocharger is compared with a manipulated variable limit characteristic. If the manipulated variable threatens to exceed the manipulated variable limit characteristic, the manipulated variable is limited to the value of the manipulated variable limit characteristic. The manipulated variable limit characteristic is a time-dependent function, the manipulated value limit characteristic having a first time-limited (dynamic) portion and a second chronologically subsequent (stationary) portion following a change in the setpoint boost pressure, the first portion ending after a predetermined target time, the second portion of the manipulated value limit characteristic being reduced with respect to the first portion in such a way that the maximum rotational speed is not reached. The first portion may also be referred to as the dynamic portion, since the actual boost pressure should have reached the setpoint boost pressure by the end of the target time during a fault-free operation of the internal combustion engine and the exhaust gas turbocharger. The second portion may also be referred to as the stationary portion, since the actual boost pressure should correspond to the setpoint boost pressure after the target time during a fault-free operation of the internal combustion engine and the exhaust gas turbocharger.

This has the advantage that an excess speed of the exhaust gas turbocharger is safely avoided even in the presence of a leak or a back pressure increase in the exhaust gas system. During a fault-free operation of the internal combustion engine and the exhaust gas turbocharger, no performance impairments occur due to the manipulated variable limit characteristic, since in this case the manipulated variable does not threaten to exceed the manipulated variable limit characteristic.

The target time is predetermined in that the actual boost pressure should have presumably reached the setpoint boost pressure within the target time during a fault-free operation of the internal combustion engine and the exhaust gas turbocharger. The predetermined target time is predetermined as a function of the presently engaged gear, the atmospheric pressure and the rotational speed. The target time specifies the hypothetical point in time that the target operating point, i.e. the actual boost pressure, should have reached the setpoint boost pressure. This target time, and thus the duration of the dynamic portion, may be obtained in advance by means of a comparison measurement or by simulations. These target times, and thus the length of the first, dynamic portion, are independent of the actual difference between the setpoint boost pressure and the actual boost pressure. This has the advantage that a feedback occurs during the regulation when a leak occurs or during an increase in the exhaust gas back pressure. A closed-loop regulation is used, in particular. Due to the fact that the target time is already predetermined, the risk of the exhaust gas turbocharger being driven to full output for too long is avoided, due to a delayed buildup of the actual boost pressure. If a leak should now in fact occur, or if the exhaust gas back pressure in the exhaust gas system increases, for example due to deposits in a particulate filter, the actuator position is automatically already reversed by the manipulated variable limit characteristic according to the invention if the actual boost pressure should theoretically already have reached the setpoint boost pressure, but the actual boost pressure has not yet reached the setpoint boost pressure due to the leak or the increased exhaust gas back pressure. This has the disadvantage that the actuator position is limited by the stationary portion at an early point during a loading of the particulate filter, even though the actual boost pressure has not yet reached the setpoint boost pressure, and the driving power is thus minimally reduced to avoid an excess rotational speed of the exhaust gas turbocharger. However, the method according to the invention has the advantage that the method is easy to implement, since the input of the manipulated variable limit characteristic, including the determination of the theoretic target times for reaching the setpoint boost pressures, may be easily carried out by comparison measurements or simulations.

The target time is predefined as a function of multiple variables, namely the gear the vehicle is in, the prevailing atmospheric pressure and the rotational speed of the engine. The atmospheric pressure may be determined as a function of the elevation of the vehicle. If no leak and no increased exhaust gas back pressure occur, the operation of the exhaust gas turbocharger is not limited by the method. In addition, the target time depends on the size of the setpoint boost pressure change. In the case of a larger setpoint boost pressure change, it takes correspondingly longer for the actual boost pressure to reach the setpoint boost pressure.

The first portion of the manipulated variable limit characteristic is preferably a constant function. The manipulated value may in this case be selected in such a way that it corresponds, in particular, to the dynamic portion of the manipulated variable limit characteristic. A maximum possible turbocharger actuator position is taken up. In other words, the stationary portion corresponds to a maximum actuator position.

A full modulation of the manipulated variable is described by the first, dynamic portion, the dynamic portion being a constant function up to the end of the target time. The setpoint boost pressure is preferably built up quickly hereby. The actuator is held in the maximum position during this first time until the target time is reached.

The second, stationary portion of the manipulated value limit characteristic is preferably an, in particular, monotonously decreasing function. This has the advantage that, due to an increasing engine rotational speed, an increasing mass flow is taken into account by a greater increase in the limiting of the manipulated variable to protect the exhaust gas turbocharger prior to reaching the maximum rotational speed.

The manipulated variable preferably describes the position of a waste gate, the waste gate being closed upon a full modulation of the manipulated variable, so that the maximum possible exhaust gas flow is available at the turbine wheel.

Alternatively, a guide vane position of an exhaust gas turbocharger having a variable turbine geometry may be described by the manipulated variable. In the case of an exhaust gas turbocharger having a variable turbine geometry, the full modulation corresponds to a closed position of the guide vanes, so that the turbine power is maximized by the buildup of pressure upstream from the turbine.

A particulate filter, in particular a gasoline engine particulate filter or a diesel engine particulate filter, is used in the exhaust tract. The method is suitable, in particular, for use in internal combustion engines equipped with a particulate filter, since a back pressure increase in the exhaust tract may occur here.

The method can be implemented in software in a control unit, the described method being applicable or executable by the software.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows a setpoint boost pressure, an actual boost pressure of a manipulated variable of the exhaust gas turbocharger as well as a manipulated variable limit characteristic having a first, dynamic portion and a second, stationary portion, no leaks and no increased exhaust gas back pressure occurring; and FIG. 2 shows a diagram of a setpoint boost pressure, a delayed built-up actual boost pressure, a theoretically necessary control variable for reaching the setpoint boost pressure, thus again the manipulated variable limit characteristic, a leak and/or an increased exhaust gas back pressure occurring.

DETAILED DESCRIPTION

FIGS. 1 and 2 show a setpoint boost pressure 1, 2, the setpoint boost pressure first being at a low level up to a point in time t0 and being at a higher level, namely setpoint boost pressure 2, starting at point in time t0. Such a change in setpoint boost pressure 1, 2 and point in time t0 may occur, for example, if the driver speeds up.

During a regulation of the exhaust gas turbocharger, actual boost pressure 3 is compared with setpoint boost pressure 1, 2. In particular, a closed-loop controller is used to regulate the boost pressure. Actual boost pressure 3 corresponds to setpoint boost pressure 1 at point in time t0. Actual boost pressure 3 increases to the value of setpoint boost pressure 2 at later point in time t1. The time period between point in time t0 and point in time t1 is designated by Δx. A manipulated variable 4, 5, 6 of the exhaust gas turbocharger is changed to now increase actual boost pressure 3 starting from point in time t0. Manipulated variable 4 is less than 100% up to point in time t0. Between points in time t0 and t1, manipulated variable 5 is 100%, and starting at point in time t1, manipulated variable 6 is continuously reduced from the previous 100% full modulation of the exhaust gas turbocharger. Manipulated variable 4, 5, 6 describes, for example, the guide vane position of a VTG exhaust gas turbocharger or the position of a waste gate valve. During the full modulation between points in time t0 and t1, the waste gate valve is completely closed, and it is gradually opened starting at point in time t1 and is opened even farther prior to point in time t0. In the case of a VTG exhaust gas turbocharger, the guide vane position is closed in time period Δx, so that the turbine of the exhaust gas turbocharger undergoes maximum acceleration. Starting at point in time t1, the guide vane position is increasingly opened.

The exhaust gas turbocharger is protected against an exceeding of a maximum rotational speed. For this purpose, manipulated variable 4, 5, 6 assigned to the exhaust gas turbocharger is compared with a manipulated variable limit characteristic 7, 8, and manipulated variable 4, 5, 6 is limited, if necessary, to the value of manipulated variable limit characteristic 7, 8 during the regulation. Manipulated variable 4, 5, 6 may maximally take on the value of manipulated value limit characteristic 7, 8.

Manipulated variable limit characteristic 7, 8 has a time-limited first, dynamic portion 7 and a chronologically subsequent second, stationary portion 8, following a change in setpoint boost pressure 1, 2 at point in time t0. First, dynamic portion 7 ends at point in time t1 after a predetermined target time Δx. Target time Δx specifies the time period within which actual boost pressure 3 has presumably reached setpoint boost pressure 2. This time period or target time Δx is determined ahead of time by measurements or by a simulation or a calculation.

FIG. 1 shows an operating state of the internal combustion engine and the motor vehicle, in which no leaks and no increased back pressure occur, and actual boost pressure 3 now reaches setpoint boost pressure 2 within target time Δx, i.e. up to point in time t1. First, dynamic portion 7 is preferably constant within time window Δx. Dynamic portion 7 corresponds to full modulation of manipulated variable 5, which is clarified in the drawing by the indication "100%."

The full modulation of manipulated variable 7 is canceled by manipulated variable 6 after time t1, since the rotational speed of the internal combustion engine increases simultaneously, and the position of the waste gate may be partially open, or the position of the guide vane may be partially open, due to the now increased mass flow through the exhaust gas turbocharger. Manipulated variable 5 and dynamic portion 7 coincide during time Δx. Afterwards, i.e. after time t1, manipulated variable 6 is below stationary portion 8 of manipulated variable limit characteristic 7, 8. The profile of stationary portion 8 is selected in such a way that the exhaust gas turbocharger is unable to reach the maximum rotational speed even with an increased mass flow. The method has the advantage that, without the presence of a leak and/or the presence of an increased exhaust gas back pressure—for example, due to a loaded gasoline engine particulate filter—manipulated variable 6, 7 is not limited, whereby no driving power impairments occur.

FIG. 2 now shows a case, in which a leak and/or an increased exhaust has back pressure occur(s), due to a loaded particulate filter.

Once again, the same change in setpoint boost pressure 1, 2 is illustrated at a point in time t0. A delayed buildup of actual boost pressure 9 now occurs, due to the leak. Actual boost pressure 9 has not yet reached setpoint boost pressure 2 at point in time t1. To now protect the exhaust gas turbocharger against an excess rotational speed, a full modulation of the exhaust gas turbocharger is canceled at point in time t1, since stationary portion 7 of manipulated variable limit characteristic 7, 8 takes effect starting at point in time t1. In other words, manipulated variable 10 runs along manipulated variable limit characteristic 8, namely stationary portion 8, starting at point in time t1. FIG. 2 also shows the embodiment if no excess rotational speed protection were present, in which case the manipulated variable would continue to be held in the full modulation during time period Δy between point in time t1 and point in time t2 (cf. reference numeral 11), and the full modulation of manipulated variable 11 is canceled in the form of decrease 12 only at point in time t2, when actual boost pressure 9 has, in fact, reached setpoint boost pressure 2. However, this case is prevented by the excess rotational speed protection, since the manipulated variable has already been limited by stationary portion 8 after previously stored time t1.

The method has the advantage that manipulated variable limit characteristic 7, 8 is easy to input and also has a maximum effect. Turbocharger damage due to an excess rotational speed may be effectively and safely avoided thereby. With the aid of the method, the manipulated variable limit characteristic in stationary portion 8 as well as in dynamic portion 7 is determined in such a way that a maximum possible turbocharger actuator position is calculated. This manipulated variable limit characteristic is independent of the actual change in actual boost pressure 3, 9. Due to the fact that the manipulated variable limit characteristic is independent of the actual boost pressure, feedback is avoided if a fault occurs, for example due to an excessively high exhaust gas back pressure or due to a leak. With the aid of the method according to the invention, the turbocharger actuator may be limited in its position in the case of a fine leak or a high particulate filter load, so that no excess rotational speed occurs. The advantage is achieved with the aid of the method that the fault-free operation of the internal combustion engine is not affected by the limitation (cf. FIG. 1).

If another dynamic change in the driving behavior is now expected after point in time t1 or t2, the method starts over again, and the time-limited actuator limiting takes effect again for the transient operation. The method prevents the disturbance variables from being compensated for by more turbine power when regulating the pressure of the engine and the exhaust gas turbine using a closed-loop controller, which could result in damage to the charger.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A method for controlling and/or regulating an exhaust gas turbocharger of an internal combustion engine, the exhaust gas turbocharger being protected against an exceeding of a maximum rotational speed, the method comprising:

comparing an actual boost pressure with a setpoint boost pressure in that a manipulated variable assigned to the exhaust gas turbocharger is compared with a manipulated variable limit characteristic and if a value of the manipulated variable is to exceed a value of the manipulated variable limit characteristic, the manipulated variable is limited to the value of the manipulated variable limit characteristic, the manipulated variable limit characteristic having a time-limited first portion and a chronologically subsequent second portion, the first portion and the second portion following a change in the setpoint boost pressure, the first portion ending after a predetermined target time; and reducing the second portion of the manipulated variable limit characteristic with respect to the first portion so that the maximum rotational speed of the exhaust gas turbocharger is not reached.

2. The method according to claim 1, wherein the predetermined target time is predetermined in that the actual boost pressure should presumably have reached the setpoint boost pressure within the predetermined target time during a fault-free operation.

3. The method according to claim 1, wherein a full modulation of the manipulated variable is described by the first portion, the first portion being a constant function up to the end of the predetermined target time.

4. The method according to claim 1, wherein the second portion of the manipulated variable limit characteristic is a monotonously decreasing function.

5. The method according to claim 1, wherein a position of a waste gate is described by the manipulated variable, the waste gate being closed in a case of a full modulation of the manipulated variable.

6. The method according to claim 1, wherein a guide vane position of the exhaust gas turbocharger having a variable turbine geometry is described by the manipulated variable.

7. The method according to claim 1, wherein a particulate filter is used in an exhaust tract of the internal combustion engine.

8. The method according to claim 7, wherein the particulate filter is a gasoline engine particulate filter.

9. The method according to claim 1, wherein the predetermined target time is predetermined as a function of a size of a setpoint boost pressure change, a presently engaged gear, an atmospheric pressure and a rotational speed of the internal combustion engine.

* * * * *